United States Patent [19]

Smock

[11] 3,711,157

[45] Jan. 16, 1973

[54] AIR-ELEVATED DUMPING VEHICLE

[76] Inventor: Edmund G. Smock, 1502 Augusta Street, Zanesville, Ohio 43701

[22] Filed: June 1, 1971

[21] Appl. No.: 148,738

[52] U.S. Cl. ........................................298/8 R, 298/22 R
[51] Int. Cl. ..................................................B60p 1/16
[58] Field of Search.........298/8, 22 R, 18, 17.6, 17.7

[56] References Cited

UNITED STATES PATENTS

| 3,659,899 | 5/1972 | Phillips | 298/22 R |
| 513,446 | 1/1894 | Trapp | 298/22 R |
| 1,965,476 | 7/1934 | Smith | 298/17.7 X |

FOREIGN PATENTS OR APPLICATIONS

| 930,163 | 7/1963 | Great Britain | 298/22 |
| 161,243 | 7/1964 | U.S.S.R. | 298/22 R |
| 455,000 | 2/1950 | Italy | 298/8 R |

Primary Examiner—Richard J. Johnson
Attorney—Mahoney, Miller & Stebens

[57] ABSTRACT

A dumping vehicle comprising a dump body pivotally mounted on the vehicle chassis frame for movement between a horizontal normal position and an inclined dumping position using an air bag or air bellows as a means of power to raise and lower the dump body. The dump body is so pivoted and the air bellows is so disposed between the body and the chassis frame that maximum lift is obtained with a minimum stroke of the air bellows.

7 Claims, 7 Drawing Figures

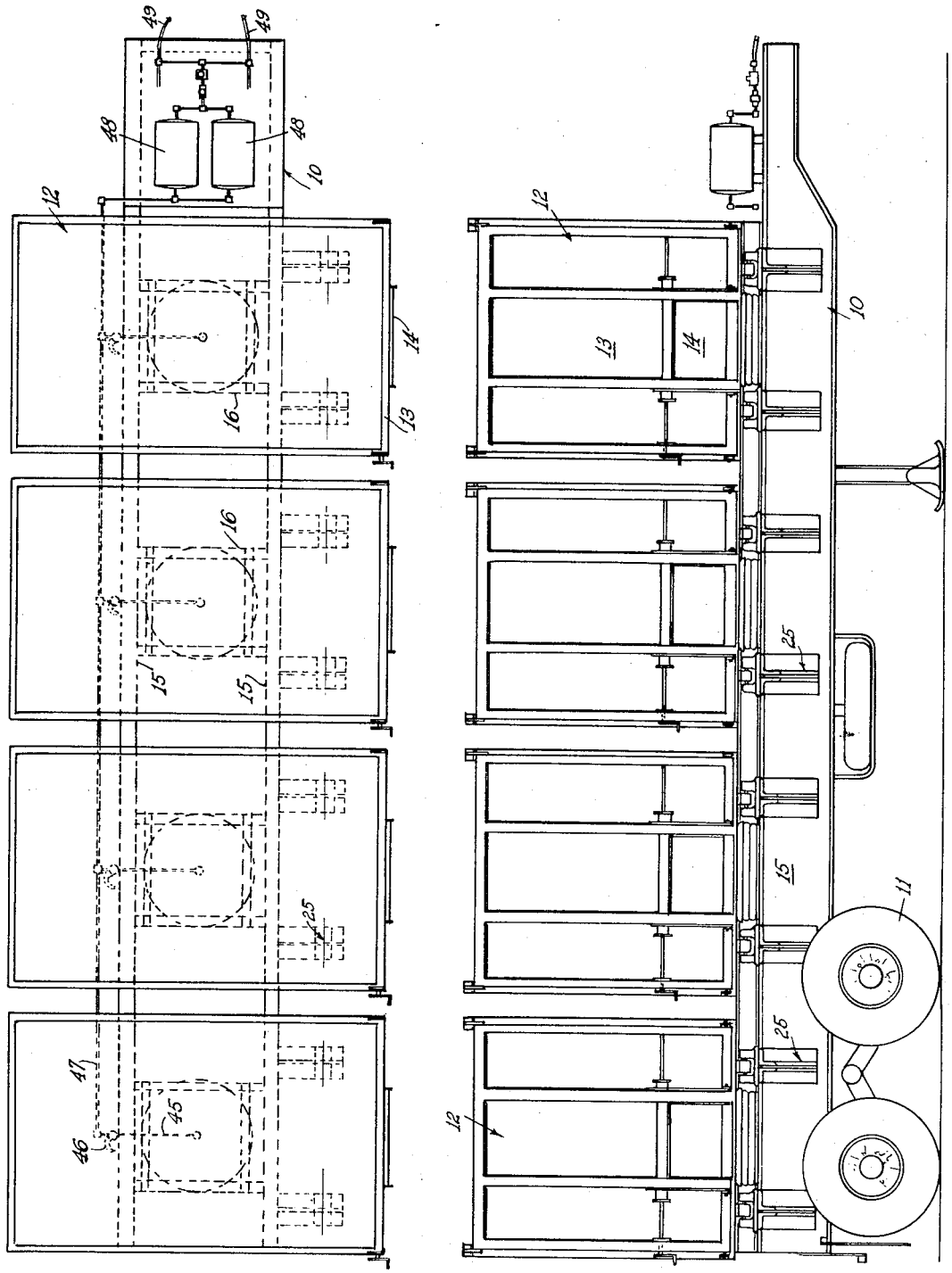

INVENTOR
Edmund G. Smock

AIR-ELEVATED DUMPING VEHICLE

The dumping body of my invention may be mounted on a truck chassis or a trailer chassis. It can be mounted as a single body on a vehicle chassis or, as disclosed herein, as multiple bodies disposed transversely on a long trailer chassis and being pivoted for dumping individually but all to the same side of the trailer. The pivot or hinge structure of the body to the vehicle chassis frame is such that a minimum lift will dump the body. The lifting means according to my invention is in the form of an air bag or air bellows which is connected between the chassis frame and the dump body and is so related to the pivot for the dump body that a short stroke of the bellows will produce a substantial lift of the body to dumping position.

The best mode contemplated in carrying out this invention is illustrated in the accompanying drawings in which:

FIG. 1 is a side elevational view of a trailer embodying my invention and including a plurality of the dump bodies pivotally mounted transversely of the chassis for selective elevation by the air bellows elevating means to dump transversely at one side of the trailer.

FIG. 2 is a plan view of the trailer of FIG. 1.

Figure 3:
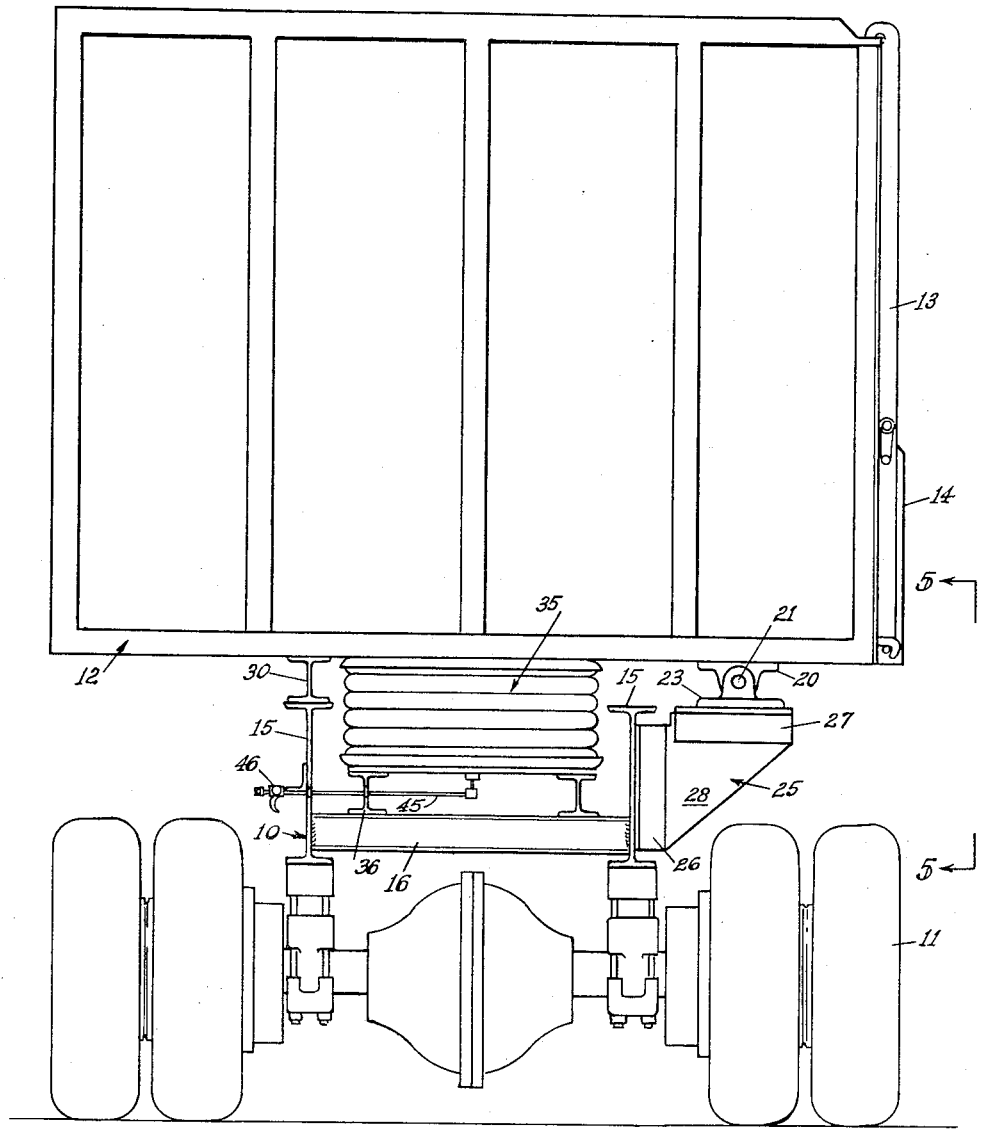
FIG. 3 is an enlarged rear view of the trailer showing the rearwardmost dump body and the air bellows and pivot arrangement therefor, the body being in its normal lower position.

With particular reference to the drawings, in FIGS. 1 and 2, I have illustrated my invention incorporated in a trailer which includes a chassis that has a long frame 10 carried on the rear wheels 11. On the chassis frame extending transversely thereof are a plurality of dump bodies 12. Four of these bodies are shown but any suitable number may be provided. These bodies 12 may be of any suitable type and are all pivoted to the chassis frame 10 for dumping to the same side of the trailer. Each of the bodies 12 may have a pivoted tailgate 13 at the one side which is opened for dumping the entire contents at once when the gate is released. However, each gate 13 may be equipped with an auxiliary discharge chute structure 14, for controlled flow dumping of the contents. This structure 14 may be of the type disclosed in my U.S. Pat. No. 3,361,476, issued Jan. 2, 1968.

Figure 4:
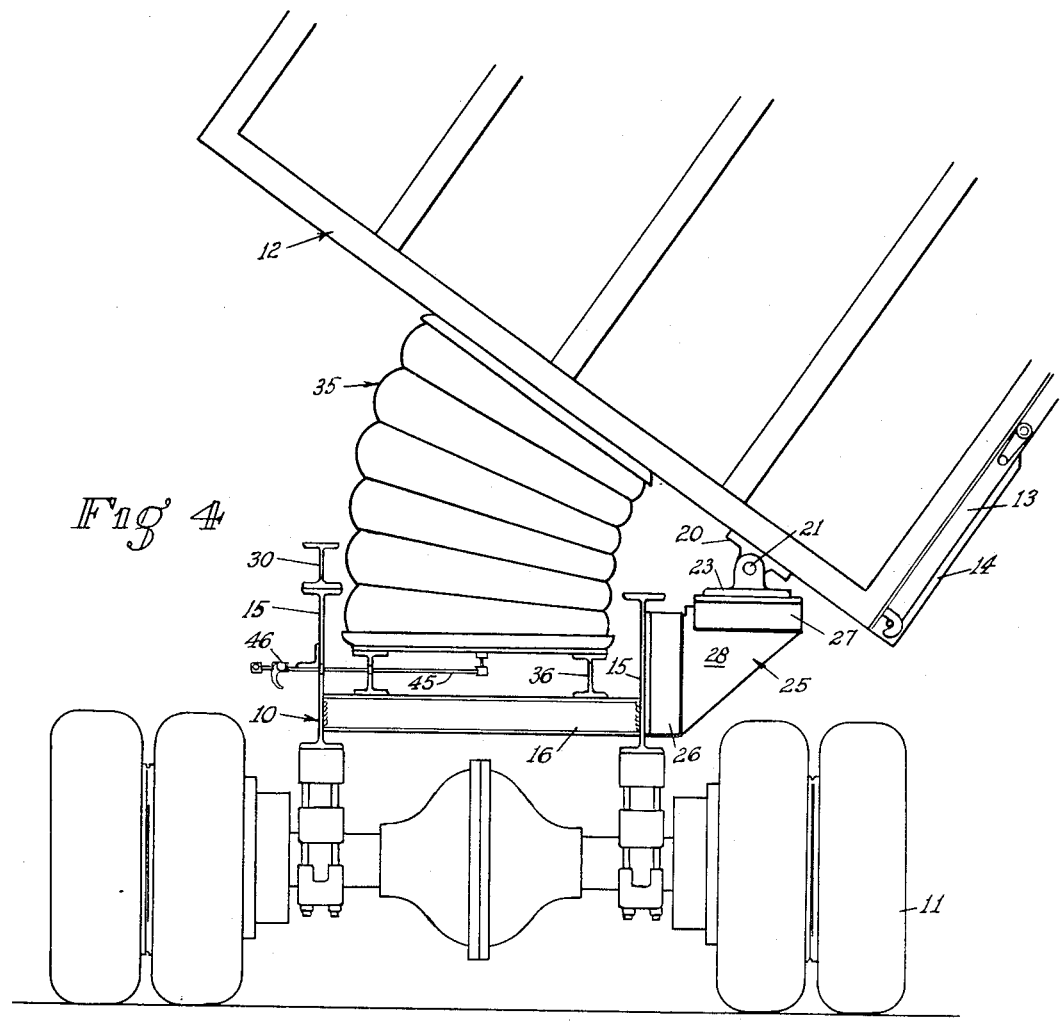
FIG. 4 is a similar view but showing the dump body in its raised dumping position.

The chassis frame 10 may be constructed in the usual manner and is shown as consisting of a pair of longitudinally extending deep I-beams 15. These I-beams, as shown best in FIGS. 3 and 4, are rigidly joined together and maintained in parallel relationship by the short cross-beams 16 extending transversely between the beams 15 and having their opposed ends welded thereto. These cross-beams 16 are disposed at regular intervals longitudinally of the I-beams 15, parallel to each other, and disposed at right angles to the beams 15.

Figure 5:
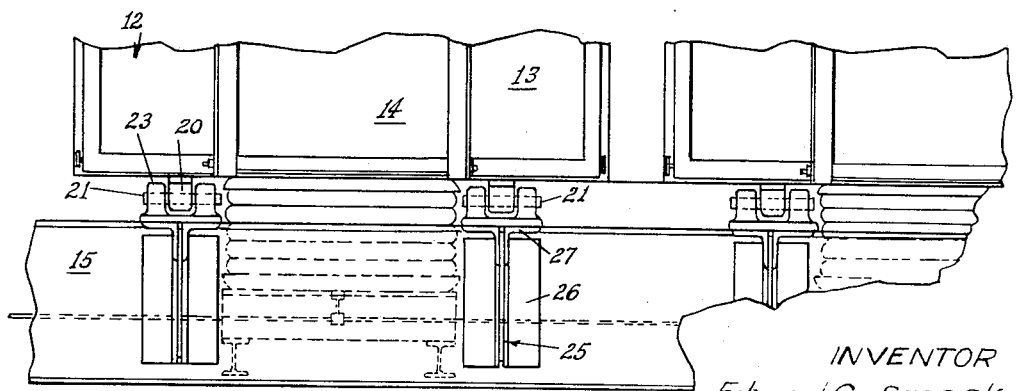
FIG. 5 is a detail in side elevation taken from the position indicated at line 5—5 of FIG. 3 to show further the pivot hinge and air bellows arrangement for the body.

As indicated previously, each of the dump bodies 12 is pivoted for dumping to one side of the trailer and the pivoting is accomplished so that minimum lift is required to raise the body into dumping position. Obviously the dumping is toward that side of the trailer where the tailgates 13 are located. The pivot arrangement includes a pivot or hinge structure 20 of rugged construction which is connected to the bottom of the dump body 12 and has a pivot pin 21 the axis of which is spaced inwardly of the tailgate end of the body 12, as shown best in FIGS. 3 and 4. Two of these hinge structures are provided for each body 12 and, as indicated in FIG. 5, the hinge structures are located adjacent the front and rear sides of the body but are spaced inwardly of the respective sides. The pivot pin 21 of each hinge connects a depending hinge lug 20 on the bottom of the body 12 to an upstanding double hinge lug 23. The double lug 23 is upstanding from a rugged support which is carried by the beam 15 at the side where the dumping is to occur. This support is a bracket structure 25 which projects out from the beam 15, at a right angle thereto, and includes a triangular plate 28 which is disposed upright with its inner edge disposed within and welded to a pair of spaced angle strips 26 welded to the outer face of the beam 15 and its upper edge disposed within and welded to a pair of spaced angle strips 27. The double hinge lug 23 rests on and is welded to the strips 27. Opposite the hinge structure on the other beam 15 is an upstanding stop bracket 30 which will engage the bottom of the dump body 12 so that when the body moves to its lowermost or normal position, the bottom will be substantially level.

As indicated previously, pneumatic bellows or air bags are used to control dumping of the bodies 12. These units are designated by the reference character 35. The pneumatic bellows or air bag units 35 may be of a type commonly manufactured and sold and usually consisting of a tubular shaped air container which is expansible and contractible axially by controlling the inlet and outlet of air under pressure. For example, the container may be made of neoprene-covered nylon cord. Each unit is supported on the chassis frame 10 below the body 12, with its lower end secured to the frame and its upper end secured to the body. The lower end of each bag unit is supported by and attached to a pair of longitudinally extending beam supports 36 which rest on the cross beams 16. The upper end of each bag unit is connected directly to the bottom of the respective body 12. With the body 12 in its lowermost position, the unit 35 will be collapsed downwardly mainly into the space between the beams 15, as shown in FIG. 3. However, when the unit is expanded, the unit 35 will be extended upwardly, as indicated in FIG. 4. The unit 35 will tilt toward the pivot axis 21 as indicated. This will cause the body 12 to pivot upwardly about the hinge axis 21 so as to dump the contents from the tailgate end. Because the pivot axis 21 is spaced inwardly from the tailgate end of the body 12 and the unit 35 is closely adjacent the pivot axis, a minimum stroke of the unit 35 will result in a maximum elevation of the dump body 12 thereby facilitating discharge of its contents.

Figure 6:
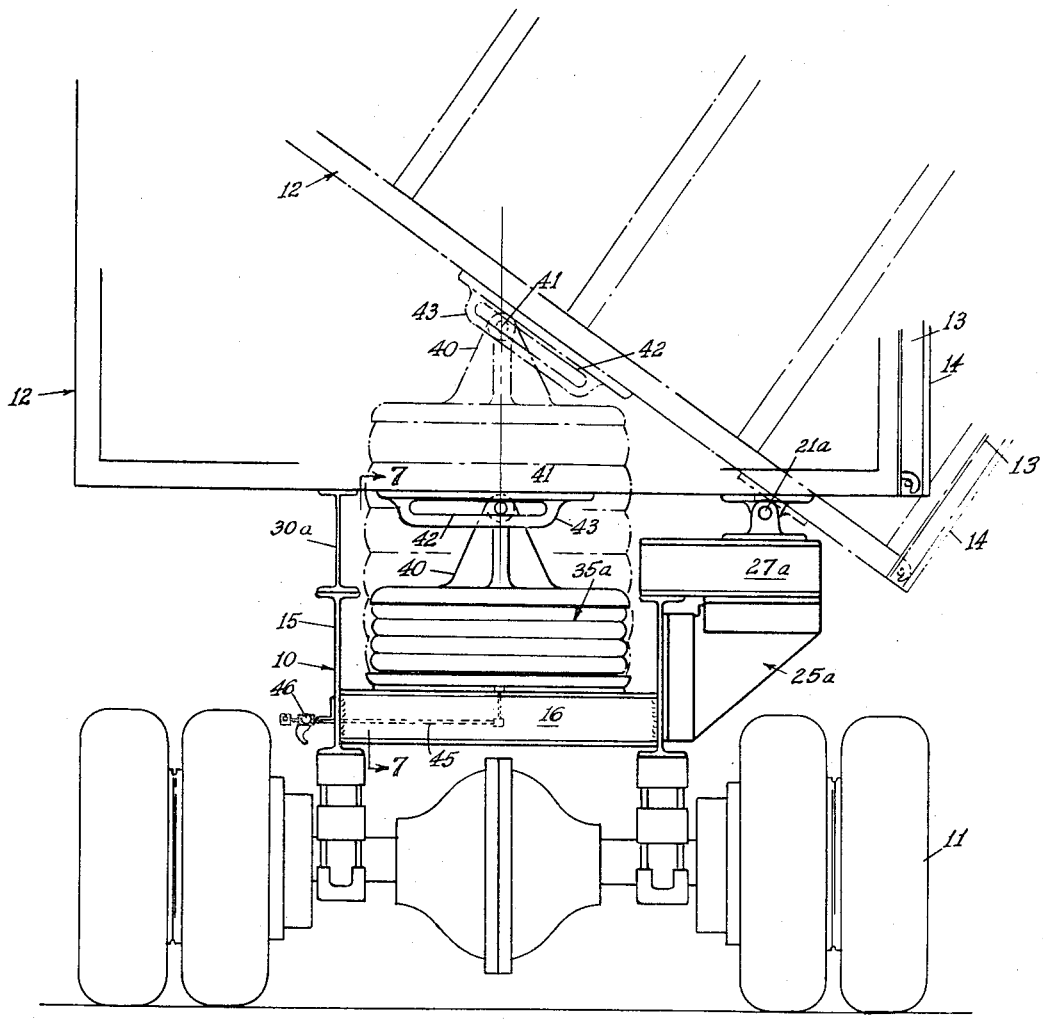
FIG. 6 is a view similar to FIG. 3 but showing a different connection between the air bellows and dump body, the raised position of the body being also shown in broken lines.
Figure 7:
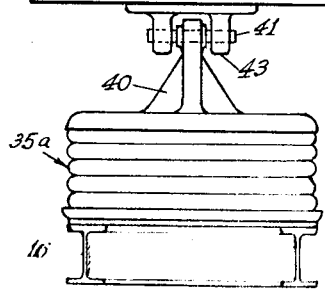
FIG. 7 is a vertical sectional view taken substantially alone line 7—7 of FIG. 6.

In FIGS. 6 and 7, I have shown an arrangement similar to that in FIGS. 3 and 4 with the exception that a different means is provided for connecting the upper end of the pneumatic bellows to the bottom of the dump body. Also, the hinge structure is slightly different. In this case, the hinge 21a is supported by a beam 27a on the bracket 25a so that it is somewhat higher. Also, the opposed stop-beam 30a is deeper and this results in more space for the pneumatic bellows 35a and a connector bracket 40 provided on the upper end thereof. This bracket 40 is upstanding from the bellows 35a and is provided with a transverse connector pin 41 which slides in a groove 42 formed in a double loop track member 43 which is attached to the bottom of the body 12. This member 43 extends in a direction at right angles to the pivot axis of the hinge 21a. Thus, as indicated by the broken lines in FIG. 6, when the unit 35a is extended, the pin 41 will slide in the member 43 and the extension of the unit 35a will be strictly axial so that it will remain upright. This will have all the advantages of the previously described lift structure, and in addition, the bellows will not be twisted.

Any suitable pneumatic system may be provided for selective control of the various pneumatic bellows. In the example shown, each bellows has a line 45 connected to its lower end. Each of these lines is controlled by a manual valve 46. All of these lines 45 are connected to a common supply line 47 shown in FIG. 1. This supply line is connected to a source of supply of air under pressure such as the air tanks 48 carried on the front end of the chassis frame 10. These tanks are provided with inlet lines 49 which may be coupled to and uncoupled from the air system of the trunk tractor. Obviously, each of the bodies 12 can be independently dumped by operation of the respective control valve 46.

It will be apparent that my invention provides for a dumping vehicle including a dump body pivotally mounted on the vehicle chassis frame for movement between a horizontal normal position and an inclined dumping position using an air bag or air bellows as a means of power to raise and lower the dump body. The dump body is so pivoted and the air bellows is so disposed between the body and the chassis frame that maximum lift is obtained with a minimum stroke of the air bellows.

Having thus described my invention, what is claimed is:

1. A dump vehicle comprising a chassis having a frame, a dump body pivoted to said frame at a pivot axis for movement from a normal substantially horizontal position to an elevated inclined dumping position, and means for moving said body between said positions, said means comprising an air bellows connected between the frame and said dump body at a location spaced from said pivot axis, and means for controlling flow of air to and from said bellows;

said body having a dump end, said pivot axis being spaced inwardly of the dump end, said air bellows being located inwardly of but closely adjacent said pivot axis;

said air bellows being supported on the frame in normally upright position with its lower end connected to the frame, said dump body having a bottom, said bellows having its upper end connected to the bottom by a slidable pivot connection between the upper end of the bellows and the bottom, said connection permitting movement of the pivot thereof in a vertical direction only as the dump body is raised and lowered so as to maintain the bellows upright.

2. A vehicle according to claim 1 in which the chassis frame includes a pair of longitudinally extending parallel support beams, said dump body being disposed transversely of said beams, said pivot axis being provided by a hinge structure connected to the bottom of the dump body adjacent a tailgate discharge end, said hinge structure being supported by a bracket structure extending outwardly from one of the beams, said air bellows being supported in the space between the beams and being anchored therein, the upper end of the bellows being connected to the bottom of said dump body.

3. A vehicle according to claim 2 in which the hinge is connected to the dump body at a point spaced inwardly of its discharge end adjacent the outer extremity of said bracket.

4. A vehicle according to claim 3 in which the upper end of the air bellows is fixed to the bottom of the dump body.

5. A vehicle according to claim 4 in which the upper end of the bellows is connected to the bottom of the dump body by a pivot which slides relative to the bottom of the body in a direction at right angles to the pivot axis during raising and lowering of the dump body to permit the bellows to remain upright.

6. A vehicle according to claim 3 in which the dump body is provided with a tailgate having an auxiliary gate thereon.

7. A vehicle according to claim 3 in which a plurality of the dump bodies are provided at spaced intervals along said beams and are all pivoted thereto for dumping at the same side of the frame, and means for selectively controlling the respective bellows of the plurality of dump bodies.

* * * * *